United States Patent [19]

Moritz et al.

[11] Patent Number: 4,625,507
[45] Date of Patent: Dec. 2, 1986

[54] GUIDE CHAIN

[75] Inventors: Werner Moritz; Friedrich Haschek, both of Siegen, Fed. Rep. of Germany

[73] Assignee: Kabelschlepp Gesellschaft mit beschränkter Haftung, Siegen, Fed. Rep. of Germany

[21] Appl. No.: 706,706

[22] Filed: Feb. 28, 1985

[30] Foreign Application Priority Data

Feb. 28, 1984 [DE] Fed. Rep. of Germany ....... 3407169

[51] Int. Cl.⁴ ............................................. F16G 13/00
[52] U.S. Cl. ...................................... 59/78.1; 248/51; 474/206; 474/207
[58] Field of Search ............... 474/207, 222, 232, 226, 474/206; 59/78.1; 248/51

[56] References Cited

U.S. PATENT DOCUMENTS

| 3,235,315 | 2/1966 | Schnacke | 474/207 X |
| 3,358,524 | 12/1967 | Patrignani | 474/207 |
| 3,448,954 | 6/1969 | Kurlandsky | 248/51 |
| 4,272,952 | 6/1981 | Graham | 474/207 X |
| 4,355,502 | 10/1982 | Sheldon | 474/207 X |

FOREIGN PATENT DOCUMENTS

| 0001656 | 10/1978 | European Pat. Off. . |
| 2045899 | 11/1973 | Fed. Rep. of Germany . |
| 2360227 | 6/1975 | Fed. Rep. of Germany . |
| 335334 | 3/1977 | Fed. Rep. of Germany . |
| 3407169 | 1/1986 | Fed. Rep. of Germany . |

Primary Examiner—James A. Leppink
Assistant Examiner—Frank McKenzie
Attorney, Agent, or Firm—Becker & Becker, Inc.

[57] ABSTRACT

A guide chain with supporting link chains including chain links which are connected by crosspieces. To limit the mutual pivot angle, each chain link is provided with slots which extend about a common pivot axis, with engaging studs of an adjacent chain link extending into the slots. In order to facilitate assembly and improve the support capability of the guide chain, each chain link is made as one piece, is provided at one end, on one side, with a disc-shaped plate in which are disposed the slots, and is provided at the other end, on the opposite side, with a cup, on the bottom of which are formed the engaging studs. The diameter of the plate is less than the diameter of the cup, so that the plate of one chain link can be placed into the cup of another chain link.

9 Claims, 10 Drawing Figures

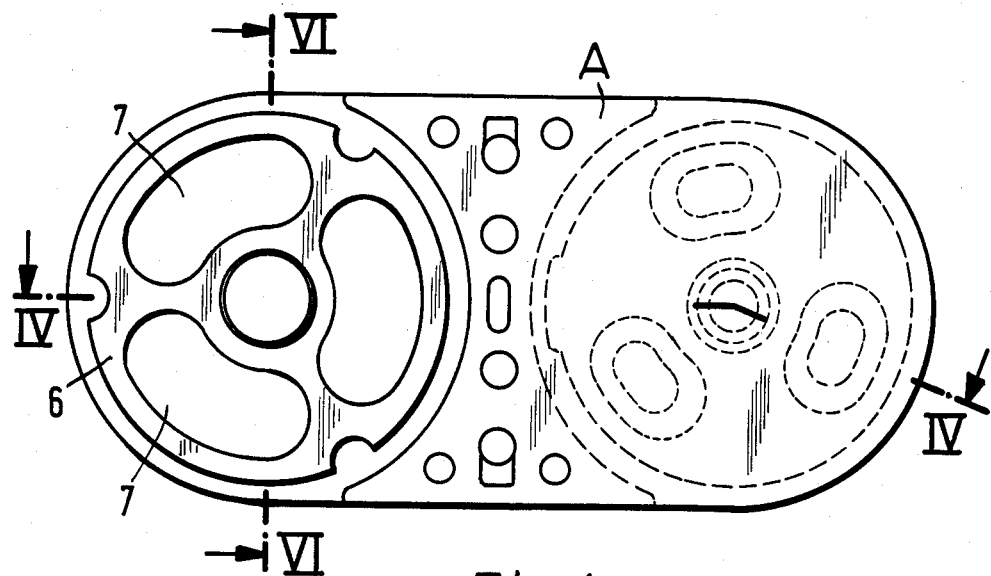
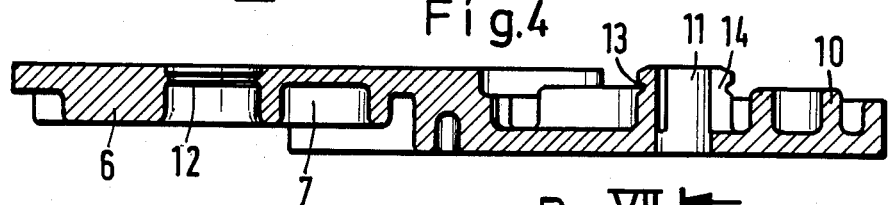
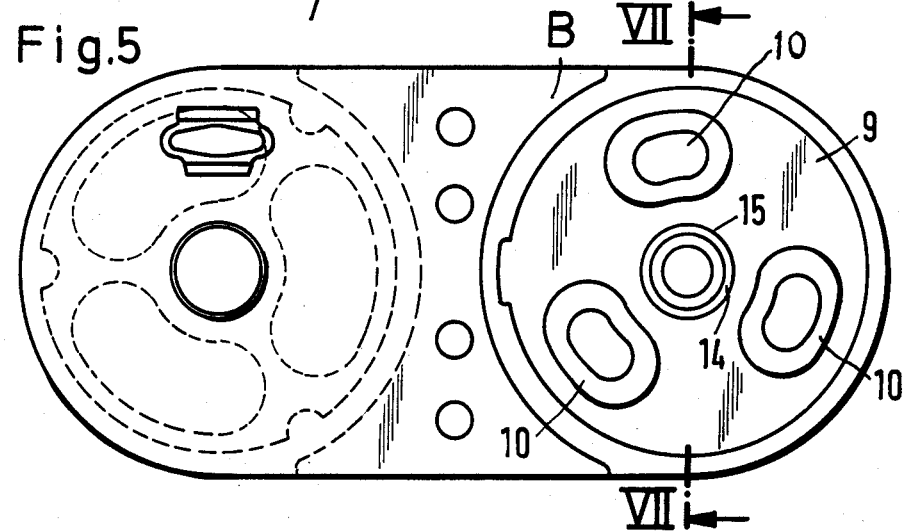

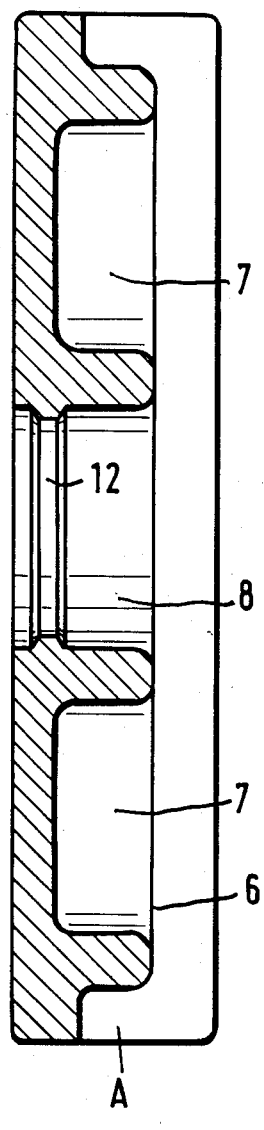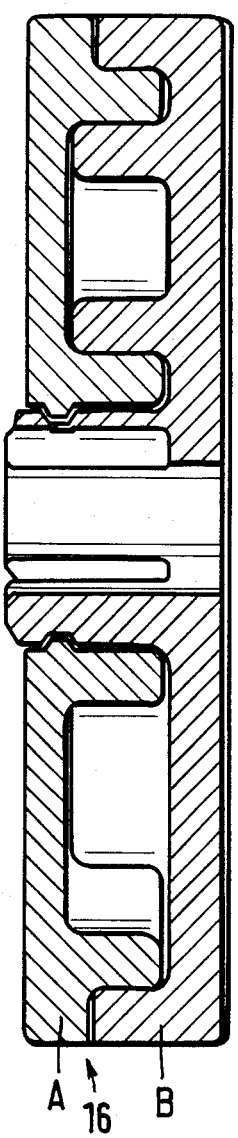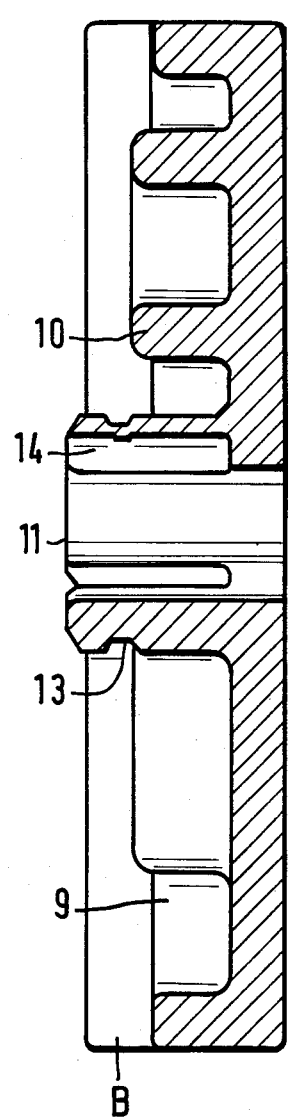

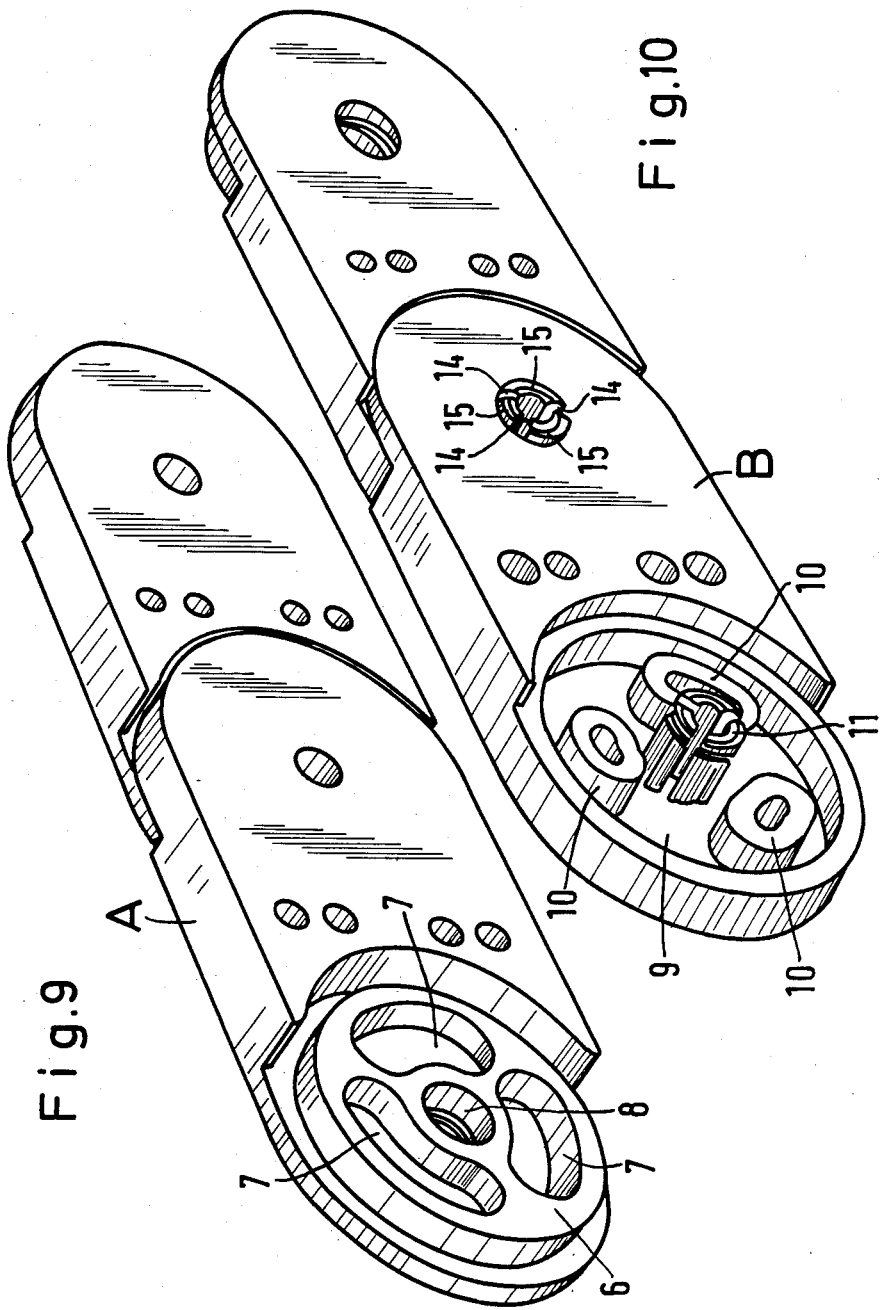

GUIDE CHAIN

BACKGROUND OF THE INVENTION

1. Field of the Invention

The present invention relates to a guide chain for feeding energy and other consumable material of all types via lines from a stationary connection to a movable consuming device; the lines are disposed in internal spaces of a supporting link chain, including chain links which are interconnected by crosspieces; to limit the mutual pivot angle, slots which extend about a common pivot axis are provided on each chain link, with engaging studs of the adjacent chain link extending into these slots.

2. Description of the Prior Art

A guide chain of the aforementioned general type is disclosed in German Patent No. 23 60 227. With this heretofore known guide chain, each of the chain links includes two parts which are held together by coupling pins. To limit the mutual pivot angle of adjacent chain links, slots are provided into which the engaging studs of the other chain link extend. During assembly of adjacent chain links, three structural parts must be manipulated, namely two link parts which have been connected to form one chain link, and the two link parts of the next chain link, before the coupling pins can be inserted. The manipulations necessary to accomplish this do not permit automation.

An object of the present invention is to provide a guide chain of simple construction which has one-piece chain links to simplify assembly, and which can span long self-supporting lengths.

BRIEF DESCRIPTION OF THE DRAWINGS

This object, and other objects and advantages of the present invention, will appear more clearly from the following specification in conjunction with the drawings, which schematically illustrate one preferred inventive embodiment of a guide chain, and in which:

FIG. 3 is a side view of a chain link of a guide chain slots exposed;

FIG. 4 is a sectional view taken along the line IV—IV in FIG. 3;

FIG. 5 is a side view of a chain link with the engaging studs exposed;

FIG. 6 is a section taken along the line VI—VI in FIG. 3;

FIG. 7 is a section taken along the line VII—VII in FIG. 5;

FIG. 8 is a sectional view in conformity with the sections of FIGS. 6 and 7 showing the two chain links of FIGS. 3 and 5 in the connected state;

FIG. 9 is an isometric view showing two interconnected chain links with the slots exposed; and FIG. 10 is an isometric view of two interconnected chain links with the engaging studs exposed.

SUMMARY OF THE INVENTION

The guide chain of the present invention is characterized primarily in that each chain link is in one piece, in that one end, on one side, the slots are disposed in a disc-like plate, and at the other end, on the opposite side, the engaging studs are formed on the bottom of a cup, and in that the diameter of the plate is less than the diameter of the cup, so that the plate of one chain link can be placed in the cup of another chain link.

Pursuant to one practical embodiment of the present invention, the diameter of the plate should be less than the height or width of the chain link by an amount equal to twice the thickness of one wall of the cup, so that the two parts can extend into one another with some play. For the same reason, the height of the plate should be slightly less than the depth of the cup. Furthermore, a groove should be provided between the plate and the central portion of the link to accommodate the wall of the cup.

The connection of adjacent chain links can be effected by a central pivot journal, which is expediently formed onto the bottom of the cup, and can extend into a central pivot hole of the plate. In order to automate assembly of two adjacent chain links, a snap connection can be provided between the pivot journal and the pivot hole. To provide this snap connection, the pivot journal may comprise sections which are separated from one another by slits; furthermore, that end of the pivot journal remote from the bottom of the cup may be provided with radial grooves which are adapted to be engaged by a ring or collar which projects radially inwardly into the pivot hole.

In order to reinforce the guide chain for greater line weights and/or greater self-supporting lengths, it is proposed that special pivot bolts, for example of steel, be inserted into the pivot journals, which may be hollow. However, it is also readily possible to establish the pivotal connection between adjacent chain links with only steel pivot bolts, which are then inseted into central pivot holes at both ends of the chain link.

A guide chain constructed pursuant to the teaching of the present invention has the advantage that the assembly can be automated very simply, because in each case only two structural parts have to be manipulated, and, at least with the embodiment in which the pivot journal is formed on, no further structural parts are required for the connection. A further advantage consists in that the inventive guide chain, due to its construction, can also accommodate greater line weights and/or can span greater self-supporting lengths, because in addition to the abutting surfaces between pivot journals, pivot holes, slots, and engaging studs, a support is also effected between the relatively large surfaces at the outer edge of the plate and the inner edge of the cup, so that, with the inventive guide chain, the pressure per unit of area is less as a whole than with the heretofore known guide chains.

DESCRIPTION OF PREFERRED EMBODIMENTS

Figure 1:
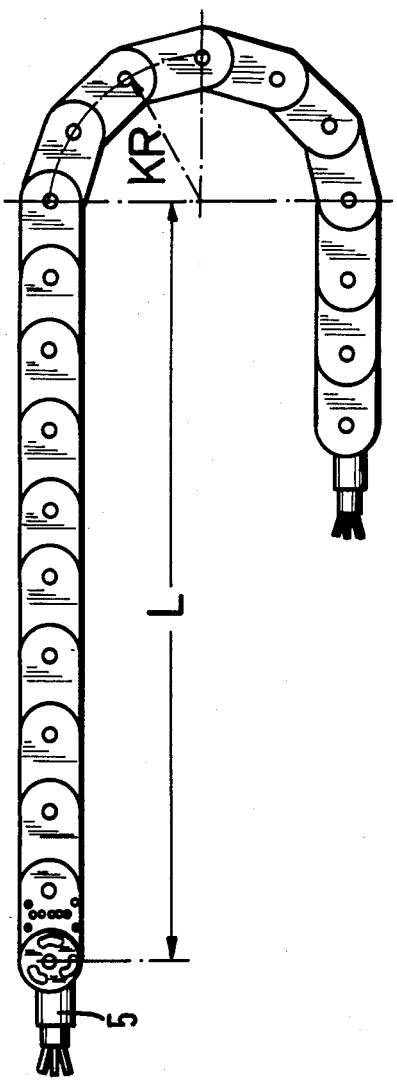
FIG. 1 is a side view of an assembled guide chain in which feed lines have been placed.
Figure 2:
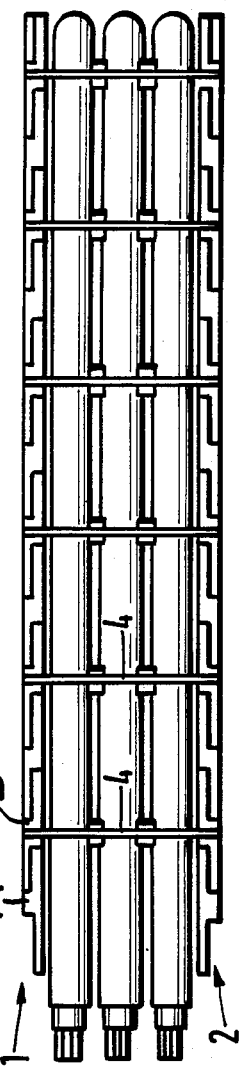
FIG. 2 is a plan view of the guide chain of FIG. 1.

Referring now to the drawings in detail, the guide chain for supplying energy and other consumable material illustrated in FIGS. 1 and 2 comprises two link chains 1,2, which extend parallel to and at a distance from one another, and which are interconnected by crosspieces 4. Disposed in the inner spaces of the crosspieces 4 are transmission or feed lines 5 which connect a stationary connection to a movable consuming device. Due to the construction of the inventive guide chain, a self-supporting length L can be spanned via the radius of curvature KR without the upper run of the guide chain sagging. As the consuming devices move, the feed lines 5 are moved back and forth in a manner relieved of stress and free of kinks.

Each link chain 1,2 comprises a plurality of chain links A,B, all of which are structurally the same. However, the ends of each chain link have a different configuration, so that the end of one chain link can be connected with the other end of another chain link.

One end of each of the chain links A,B is provided with a disc-shaped plate 6 having slots 7 and a central pivot hole 8 disposed therein. At the other end, each of the chain links A,B is provided on the opposite side with a circular cup 9 having engaging studs 10 and a central pivot journal 11 disposed therein. When one end of the link A is connected with the other end of the link B, the plate 6 extends into the cup 9, so that the engaging studs 10 of the cup 9 extend into the slots 7 of the plate 6. Furthermore, the pivot journal 11 extends into the pivot hole 8. So that the two chain links A and B cannot separate from one another, a snap connection is provided to interconnect the two links.

The snap connection between the two chain links A and B comprises a ring or collar 12 which projects radially inwardly in the pivot hole 8, and a groove 13 disposed in the pivot journal 11. So that the pivot journal 11 can be resiliently deformed, and can be inserted into the pivot hole 8, it comprises several sector-shaped sections which are separated from one another by slits 14.

The length of the slots 7, and the size of the engaging studs 10, determine the maximum radius of curvature KR of the assembled guide chain. The transfer of the bending forces in the region of curvature and the upper self-supporting run is effected from one chain link A to the adjacent chain link B via the abutting outer and inner walls of the plate 6 and the cup 9, the engaging studs 10, and the pivot journal 11.

The chain links A and B can either be extruded of platic, or, for particularly great line weights and/or self-supporting lengths, can be made of die cast metal.

Should it be necessary to make the interior of the link chairs dustproof, a seal or gasket 16 can be placed between the outer edges of the plate 6 and the inner edges of the cup 9. However, it is also possible, for the same purpose, to provide a non-illustrated serration between the plate 6 and the cup 9, so that a type of labyrinth seal is formed.

The present invention is, of course, in no way restricted to the specific disclosure of the specification and drawings, but also encompasses any modifications within the scope of the appended claims.

What we claim is:

1. An energy-conveying guide chain for feeding consumable material of all types, via lines, from a stationary connection to a movable consuming device; the lines being disposed in continuous inner spaces within said chain as link-supported therewith, which comprises:

a plurality of one-piece chain links, each of which has two ends, with a disk-shaped plate being disposed at one end, on one side of said link, and a cup with a floor being disposed at the other end, on the opposite side of said link; said plate having a central pivot axis, and slots disposed therearound in said plate at one end; said cup having a central pivot axis, and engaging studs disposed therearound and formed in the floor of said cup; each of said plates being provided with a central pivot hole disposed on said pivot axis thereof, and each of said cups being provided with a central pivot journal disposed on said piovt axis thereof; a diameter of said plate being less than a diameter of said cup, so that the plate of one chain link can be placed in the cup of another chain link readily insertable in each other for a snap connection therewith, with the engaging studs of said cup extending into the slots of said plate to limit the angle of pivot of said links relative to one another.

2. A guide chain according to claim 1, in which said cup is provided with a wall, and the diameter of said plate is less than the width of its link by an amount equal to approximately two times the thickness of said cup wall.

3. A guide chain according to claim 2, in which each link is provided with a groove between said plate and a central portion of said link to accommodate said wall of a cup of another link.

4. A guide chain according to claim 3, in which the height of said plate is less than the depth of said cup.

5. A guide chain according to claim 4, in which each of said pivot journals of said cups comprises sections which are separated from one another by slits; that end of each section remote from said bottom of said cup is provided with a groove.

6. A guide chain according to claim 5, in which each of said plates is provided with a collar which projects radially into said pivot hole, and which engages said grooves of said sections of a pivot journal which extends into said pivot hole.

7. A guide chain according to claim 4, which includes a sealing member disposed between the plate and cup of two chain links which have been placed together.

8. A guide chain according to claim 4, in which each of said chain links is made of plastic.

9. A guide chain according to claim 4, in which each of said chain links is made of die cast metal.

* * * * *